US009342914B2

(12) United States Patent
Turner et al.

(10) Patent No.: US 9,342,914 B2
(45) Date of Patent: *May 17, 2016

(54) METHOD AND SYSTEM FOR UTILIZING PRE-EXISTING IMAGE LAYERS OF A TWO-DIMENSIONAL IMAGE TO CREATE A STEREOSCOPIC IMAGE

(71) Applicant: Disney Enterprises, Inc., Burbank, CA (US)

(72) Inventors: Tara Handy Turner, Marina Del Rey, CA (US); Evan M. Goldberg, Los Angeles, CA (US); Matthew F. Schnittker, Castaic, CA (US); Joseph W. Longson, Castaic, CA (US); Robert M. Neuman, Santa Clarita, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,833

(22) Filed: Aug. 6, 2013

(65) Prior Publication Data

US 2013/0321408 A1    Dec. 5, 2013

Related U.S. Application Data

(63) Continuation of application No. 12/571,407, filed on Sep. 30, 2009, now Pat. No. 8,502,862.

(51) Int. Cl.
*H04N 15/00* (2006.01)
*H04N 13/02* (2006.01)
*G06T 13/20* (2011.01)

(52) U.S. Cl.
CPC .............. *G06T 13/20* (2013.01); *H04N 13/026* (2013.01)

(58) Field of Classification Search
CPC ............................. H04N 13/02; H04N 13/026
USPC ............... 345/419, 427; 348/56, 51; 382/154; 386/230
See application file for complete search history.

(56) References Cited

U.S. PATENT DOCUMENTS

| 4,925,294 | A | | 5/1990 | Geshwind et al. | |
| 5,510,832 | A | * | 4/1996 | Garcia | 348/56 |

(Continued)

FOREIGN PATENT DOCUMENTS

| WO | 2004/021151 | | 3/2004 |
| WO | 2008/060289 | A1 | 5/2008 |

OTHER PUBLICATIONS

European Patent Office Search Report for EP 10179710.8 "Method and System for Creating Depth and Volume in a 2-D Planar Image", Dated May 27, 2013, 7 pages.

(Continued)

*Primary Examiner* — Dustin Nguyen
(74) *Attorney, Agent, or Firm* — Dorsey & Whitney LLP

(57) ABSTRACT

Implementations of the present invention involve methods and systems for converting a 2-D multimedia image to a 3-D multimedia image by utilizing a plurality of layers of the 2-D image. The layers may comprise one or more portions of the 2-D image and may be digitized and stored in a computer-readable database. The layers may be reproduced as a corresponding left eye and right eye version of the layer, including a pixel offset corresponding to a desired 3-D effect for each layer of the image. The combined left eye layers and right eye layers may form the composite right eye and composite left eye images for a single 3-D multimedia image. Further, this process may be applied to each frame of a animated feature film to convert the film from 2-D to 3-D.

27 Claims, 9 Drawing Sheets
(1 of 9 Drawing Sheet(s) Filed in Color)

(56) References Cited

U.S. PATENT DOCUMENTS

| | | | |
|---|---|---|---|
| 5,537,528 A | 7/1996 | Takahashi et al. | |
| 6,208,348 B1 | 3/2001 | Kaye | |
| 6,515,659 B1 | 2/2003 | Kaye | |
| 6,590,573 B1 * | 7/2003 | Geshwind | 345/419 |
| 6,686,926 B1 | 2/2004 | Kaye | |
| 7,082,223 B1 | 7/2006 | Harris | |
| 7,102,633 B2 | 9/2006 | Kaye | |
| 7,116,323 B2 | 10/2006 | Kaye | |
| 7,116,324 B2 | 10/2006 | Kaye | |
| 7,254,265 B2 | 8/2007 | Naske et al. | |
| 7,256,779 B2 | 8/2007 | Donnelly | |
| 7,573,475 B2 | 8/2009 | Sullivan et al. | |
| 7,639,838 B2 | 12/2009 | Nims | |
| 8,411,931 B2 * | 4/2013 | Zhou et al. | 382/154 |
| 8,502,862 B2 | 8/2013 | Turner et al. | |
| 2002/0118275 A1 * | 8/2002 | Harman | 348/51 |
| 2002/0186216 A1 | 12/2002 | Baumberg et al. | |
| 2003/0007681 A1 * | 1/2003 | Baker | 382/154 |
| 2004/0015424 A1 | 1/2004 | Cash et al. | |
| 2004/0135780 A1 * | 7/2004 | Nims | 345/419 |
| 2004/0222988 A1 | 11/2004 | Donnelly | |
| 2005/0254702 A1 * | 11/2005 | Era | 382/154 |
| 2005/0271303 A1 | 12/2005 | Simpson | |
| 2006/0026527 A1 | 2/2006 | Bells | |
| 2006/0184279 A1 | 8/2006 | Okamoto et al. | |
| 2007/0279415 A1 * | 12/2007 | Sullivan et al. | 345/427 |
| 2008/0247670 A1 | 10/2008 | Tam et al. | |
| 2009/0195643 A1 | 8/2009 | Neuman | |
| 2009/0196492 A1 | 8/2009 | Jung et al. | |
| 2009/0219283 A1 | 9/2009 | Hendrickson et al. | |
| 2009/0219383 A1 | 9/2009 | Passmore | |
| 2009/0262184 A1 | 10/2009 | Engle et al. | |
| 2009/0322860 A1 | 12/2009 | Zhang et al. | |
| 2010/0073364 A1 | 3/2010 | Jung et al. | |
| 2010/0080448 A1 | 4/2010 | Tam et al. | |
| 2010/0265248 A1 | 10/2010 | McCrae et al. | |
| 2011/0050687 A1 * | 3/2011 | Alyshev et al. | 345/419 |
| 2011/0050864 A1 * | 3/2011 | Bond | 348/51 |
| 2011/0074778 A1 | 3/2011 | Turner et al. | |
| 2011/0074784 A1 | 3/2011 | Turner et al. | |
| 2011/0157155 A1 | 6/2011 | Turner et al. | |
| 2011/0158504 A1 | 6/2011 | Turner et al. | |
| 2011/0210969 A1 | 9/2011 | Barenbrug | |
| 2011/0304691 A1 | 12/2011 | Newton et al. | |
| 2012/0099836 A1 * | 4/2012 | Welsh et al. | 386/230 |

OTHER PUBLICATIONS

Battiato, et al., "3D stereoscopic image pairs by depth-map generation", Proceedings of the 2nd International Symposium on 3D Data Processing, Visualization, and Tranmission (3DPVT'04), IEEE, 2004, 8 pages.

Johnston, "Lumo: Illumination for Cel Animation", Proceedings of the 2nd International Symposium on Non-Photorealistic Animation and Rendering, Annecy, France, 2002, pp. 45-52 and 156.

Petrovic, et al., "Shadows for Cel Animation", Proceedings of SIGGRAPH2000, ACM Press / ACM SIGGRAPH, Computer Graphics Proceedings, Annual Conference Series, ACM 2000, pp. 511-516.

Tam, et al., "3D-TV Content Generation: 2D-to-3D Conversion", 2006 IEEE International Conference on Multimedia and Expo (Jul. 12, 2006), 1869-1872.

Brimelow, Lee, "New tutorial on parallax 3D effects", http://www.leebrimelow.com/new-tutorial-on-parallax-3d-effects/. Published on Dec. 5, 2008, 9 pages.

Engle, Rob, "Beowulf 3D: a case study", Pros. SPIE 6803, Stereoscopic Displays and Application XIX, 68030R (Feb. 29, 2008).

* cited by examiner

METHOD AND SYSTEM FOR UTILIZING PRE-EXISTING IMAGE LAYERS OF A TWO-DIMENSIONAL IMAGE TO CREATE A STEREOSCOPIC IMAGE

CROSS-REFERENCE TO RELATED APPLICATION

This application is a continuation of U.S. patent application Ser. No. 12/571,407 filed on Sep. 30, 2009, now U.S. Pat. No. 8,502,862, entitled "Method and System for Utilizing Pre-Existing Image Layers of a Two-Dimensional Image to Create a Stereoscopic Image," which is hereby incorporated in its entirety by reference as though fully disclosed herein.

FIELD OF THE INVENTION

Aspects of the present invention relate to conversion of two dimensional (2-D) multimedia content to three dimensional (3-D) multimedia content. More particularly, aspects of the present invention involve a system and method for utilizing pre-existing 2-D image layers of one or more frames of an animated film to create a corresponding 3-D animated film.

BACKGROUND

Three dimensional (3-D) imaging, or stereoscopy, is a technique used to create the illusion of depth in an image. In many cases, the stereoscopic effect of an image is created by providing a slightly different perspective of a particular image to each eye of a viewer. The slightly different left eye image and right eye image may present two perspectives of the same object, where the perspectives differ from each other in a manner similar to the perspectives that the viewer's eyes may naturally experience when directly viewing a three dimensional scene. For example, in a frame of a stereoscopic 3-D film or video, a corresponding left eye frame intended for the viewer's left eye may be filmed from a slightly different angle (representing a first perspective of the object) from the corresponding right eye frame intended for the viewer's right eye (representing a second perspective of the object). When the two frames are viewed simultaneously or nearly simultaneously, the pixel offset between the left eye frame and the right eye frame provides a perceived depth to the objects in the frames, thereby presenting the combined frames in what appears as three dimensions.

In creating stereoscopic 3-D animation, one approach to construct the left eye and right eye images necessary for a stereoscopic 3-D effect is to first create a virtual 3-D environment consisting of a computer-based virtual model of the 2-D image, which may or may not include unique virtual models of specific objects in the image. These objects are positioned and animated in the virtual 3-D environment to match the position of the object(s) in the 2-D image when viewed through a virtual camera. For stereoscopic rendering, two virtual cameras are positioned with an offset between them (inter-axial) to simulate the left eye and right eye views of the viewer. Once positioned, the color information from each object in the original image is "cut out" (if necessary) and projected from a virtual projecting camera onto the virtual model of that object. This process is commonly referred to as projection mapping. The color information, when projected in this manner, presents itself along the front (camera facing) side of the object and also wraps around some portion of the front sides of the object. Specifically, any pixel position where the virtual model is visible to the projection camera will display a color that matches the color of the projected 2-D image at that pixel location. Depending on the algorithm used, there may be some stretching or streaking of the pixel color as a virtual model bends toward or away from the camera at extreme angles from perpendicular, but this is generally not perceived by a virtual camera positioned with sufficiently small offset to either side of the projecting camera.

Using this projection-mapped model in the virtual 3-D environment, the left eye and right eye virtual cameras will capture different perspectives of particular objects (representing the left eye and the right eye views) that can be rendered to generate left eye and right eye images for stereoscopic viewing. However, this technique to convert a 2-D image to a stereoscopic 3-D image has several drawbacks. First, creating a virtual 3-D environment with virtual models and cameras is a labor-intensive task requiring computer graphics software and artistic and/or technical talent specialized in the field of 3-D computer graphics. Second, computer rendering the 2-D image may require extensive computing power to create. In addition, with animated objects, the virtual model must alter over time (frame by frame) to match the movement and deformation of the object in the 2-D image. For the best results, the alteration of the model precisely matches the movement of the object(s) frame by frame. Camera movement may also be taken into account. This is a time consuming task requiring advanced tracking and significant manual labor. In addition, this requires that the 2-D image be recreated almost entirely in a virtual 3-D environment, which also requires significant manual labor, as it implies effectively recreating the entire movie with 3-D objects, backgrounds and cameras.

SUMMARY

One implementation of the present disclosure may take the form of a method for generating a stereoscopic image. The method may include the operation of digitizing one or more two dimensional frames of a two dimensional multimedia presentation, with each two dimensional frame comprising one or more layers comprising a portion of the two dimensional frame. The method may also include the operations of generating one or more left eye layers and one or more right eye layers for the one or more layers, the one or more left eye layers horizontally offset from the respective one or more of the right eye layers. Further, the method may also include combining the one or more generated left eye layers into a composite left eye frame and combining the one or more generated right eye layers into a composite right eye frame, such that the composite left eye frame and the composite right eye frame comprise a stereoscopic frame.

Another implementation may take the form of a method for utilizing stored two dimensional frames to generate a stereoscopic frame. The method may include the operation of receiving one or more two dimensional frames comprising one or more layers including a portion of the two dimensional frame. The method may also include the operations of determining a pixel offset for the one or more layers corresponding to a perceived depth for the layer in a stereoscopic frame, generating a left eye layer and a right eye layer for the one or more layers and positioning the left eye layer relative to the right eye layer positioning the left eye layer relative to the right eye layer for the one or more layers based on the determined pixel offset to perceptually position the left eye layer and the right eye layer in the stereoscopic frame.

Yet another embodiment of the present disclosure may take the form of a system for generating a stereoscopic image. The system may comprise a database and one or more computing systems. The database may be configured to store a plurality of digitized two dimensional animated frames of an animated film, wherein each two dimensional frame is comprised of one or more layers including a portion of the two dimensional frame. In addition, the computing systems may be associated with the database to access the one or more layers and configured to perform operations of a method. Such operations include retrieving the one or more layers from the database, generating a left eye layer and a right eye layer corresponding to the one or more layers, applying a pixel offset to the one or more generated layers, the pixel offset corresponding to a perceived depth for the layer in a stereoscopic frame and combining the one or more generated layers to form the stereoscopic frame.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
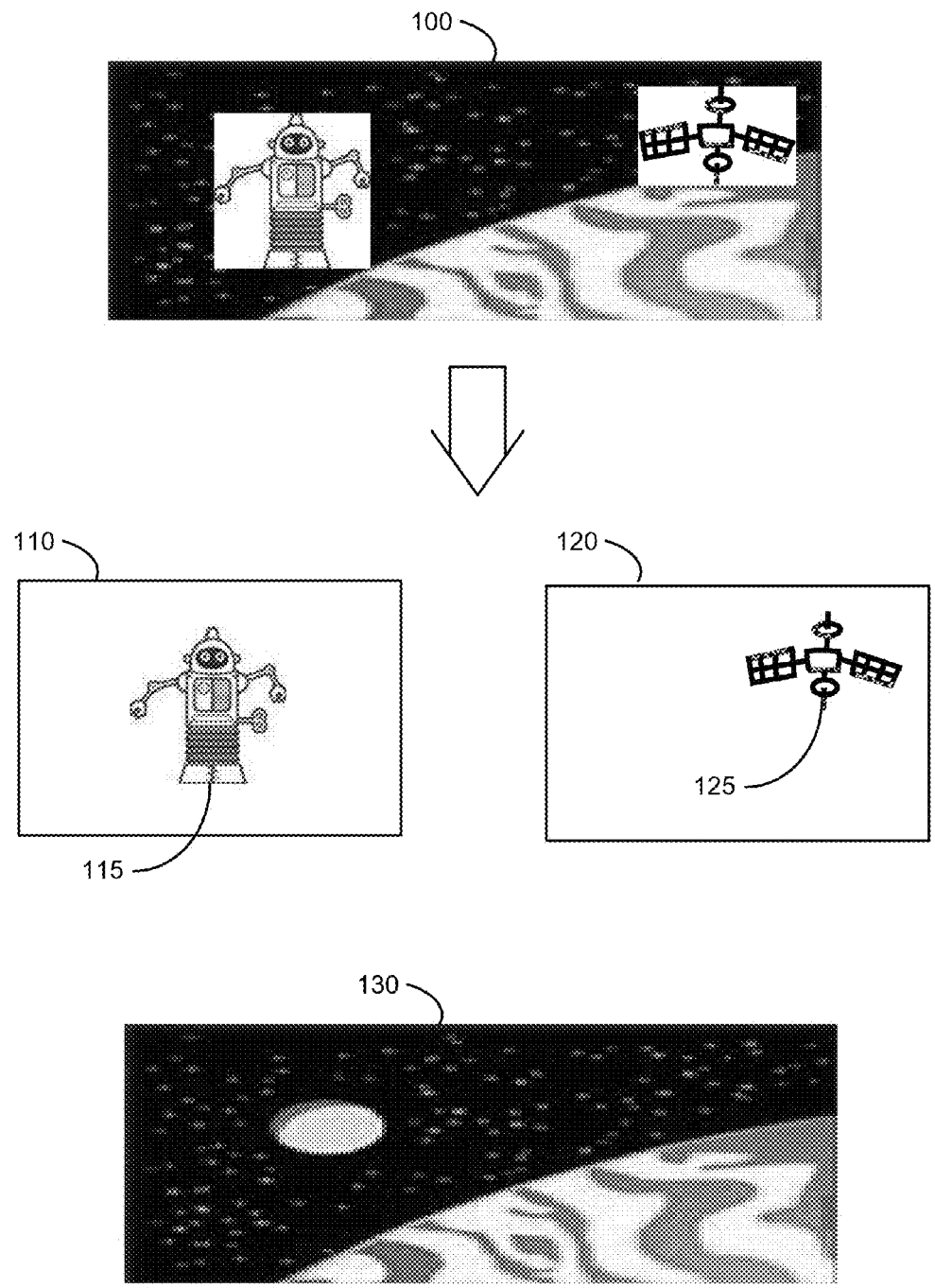
FIG. 1 is a diagram illustrating a plurality of layers of a frame of an animated multimedia presentation.

Implementations of the present invention involve methods and systems for converting a 2-D multimedia image to a 3-D multimedia image by obtaining layer data for a 2-D image where each layer pertains to some image feature of the 2-D image, duplicating a given image feature or features and offsetting in the x-dimension or z-space one or both of the image features to create stereo pairs of the image feature. Different offsets may be applied to each image feature because the image features are maintained on distinct layers. Hence, a plurality of image feature stereoscopic depths may be applied to a given 2-D image. The layers are digitized (e.g., comprised of a collection of pixels) and referenced in a computer-readable database or control file. The digitized layer data, however, may originate from hand drawn animation characters and scene features. Upon retrieval from the database, the layers may be reproduced as a corresponding left eye version of the layer and a corresponding right eye version of the layer. Further, the left eye layer and/or the right eye layer data and pixels is shifted by a pixel offset to achieve the desired 3-D effect for each layer of the image. Offsetting more or less of the x value of each pixel in an image feature of a layer creates more or less stereoscopic depth perception for that pixel. Thus, when two copies of an image feature are displayed with the image feature pixel offset, with appropriate viewing mechanisms, the viewer perceives more or less stereo depth depending on the amount of pixel offset.

The layers are recombined after pixel offsetting to achieve different gradations of stereo depth for the entirety of the original 2-D image, such that the left eye layers are combined and the right eye layers are combined. The combined left eye layers and right eye layers form composite right eye and composite left eye images for a single 3-D multimedia image. Further, this process may be applied to each frame of a animated feature film to convert the film from 2-D to 3-D. Thus, by utilizing the stored layers of a multimedia presentation and offsetting each layer according to a determined pixel offset, a 2-D image may be converted to a corresponding 3-D image.

For convenience, the embodiments described herein refer to a 2-D image as a "frame" or "2-D frame." However, it should be appreciated that the methods and devices described herein may be used to convert any 2-D multimedia image into a 3-D image, such as a photo, a drawing, a computer file, a frame of a live action film, a frame of an animated film, a frame of a video or any other 2-D multimedia image.

Animated multimedia presentations, such as animated feature films, can be created through a technique referred to as "cell animation." Traditionally, cell animation includes discrete collections of drawings copied onto transparent acetate sheets, or "cells." Because the cells are transparent, several cells may be stacked such that the collection of drawings form a single frame, which can be a frame of the animated film. In this manner, one animator may draw a first character of a frame on a first cell while a second animator may draw a second character of the same frame on a second cell. Once the cells are combined, the two characters are in the same frame. Each character is animated by drawing the characters performing incremental movements frame-by-frame so that when the frames are played sequentially, the character performs the movement. To create an animated film, a sequence of completed cells are photographed one-by-one onto motion picture film against a painted background. Thus, each frame of an animated film may contain several cells or layers that are combined to create the frame.

Further, beginning in the late 21$^{st}$ century, some animators began to incorporate computer technology into the creation of an animated film. However, to maintain the look of traditional cell animation, animators would often hand draw the images on cells as before, but would then scan each drawn cell into a computing system for storage in a database. The animators could then utilize a virtual camera of the computing system to photograph each cell or stacked cells in the same manner as a traditional cell animation to create the animated film. By scanning each cell into the computing system, the animators could utilize the computing power of the system to add camera movements and effects that were not possible with traditional cell animation. Upon completion of the constructed film in the computing system, the animated film may then be provided in several delivery mediums, including traditional film or digital video.

FIG. 1 is a diagram illustrating a plurality of cells or layers of a single frame 100 of an animated multimedia presentation, such as a single frame of an animated film. Each layer of the 2-D frame 100 may include one or more image features or objects of the frame. For example, in the layers presented, a first layer 110 includes a robot character 115, a second layer 120 includes a satellite object 125 and a background layer 130 depicts a space scene, including a planet object and a moon object. The first layer 110 and second layer 120 may be comprised of a transparent acetate sheet while the background may not be transparent. The transparency of the first layer 110 and the second layer 120 provide the effect of, when the three layers are stacked, a complete frame that includes the robot character 115, the satellite object 125 and the background 130 in a single 2-D frame. While three layers are shown in FIG. 1, a given complete frame may be constructed of any number of layers, with one or more objects of the 2-D frame included in the layers. Further, several such frames may be combined in a series, that when shown consecutively, create an animated film.

One advantage of cell animation is that each layer of each frame of the animated film may be digitally scanned or otherwise input into a computer system and stored on a computer-readable database. For example, the three layers of FIG. 1 may each, upon completion of each layer, be scanned into and stored in a database as separate layers. Further, the database may be large enough to store each layer of each frame of an entire animated film created through cell animation. One such computing system developed to digitize and store the layers of a cell-based animated film is the Computer Animation Production System (CAPS) developed by the Walt Disney Company in the late 1980s. CAPS involves several scanning cameras, servers, networked workstations and other computing devices to maintain and provide access to the cell data of an animated feature film.

It should be noted that some layers of a frame may be created and stored that are not utilized in the complete frame that forms a part of the animated film. For example, one layer of the frame may include instructions from the animator concerning colors that should be used to fill in some character, background, etc. During construction of the frame, the instructions are used to color the frame, but such instructions are generally not included in the final version of the 2-D frame. However, when storing the layers of the frame, it is common to store such instruction layers into the computing system along with the other layers of the 2-D frame to maintain a complete collection of all work performed relative to the frame and the entirety of the animation.

Figure 2:
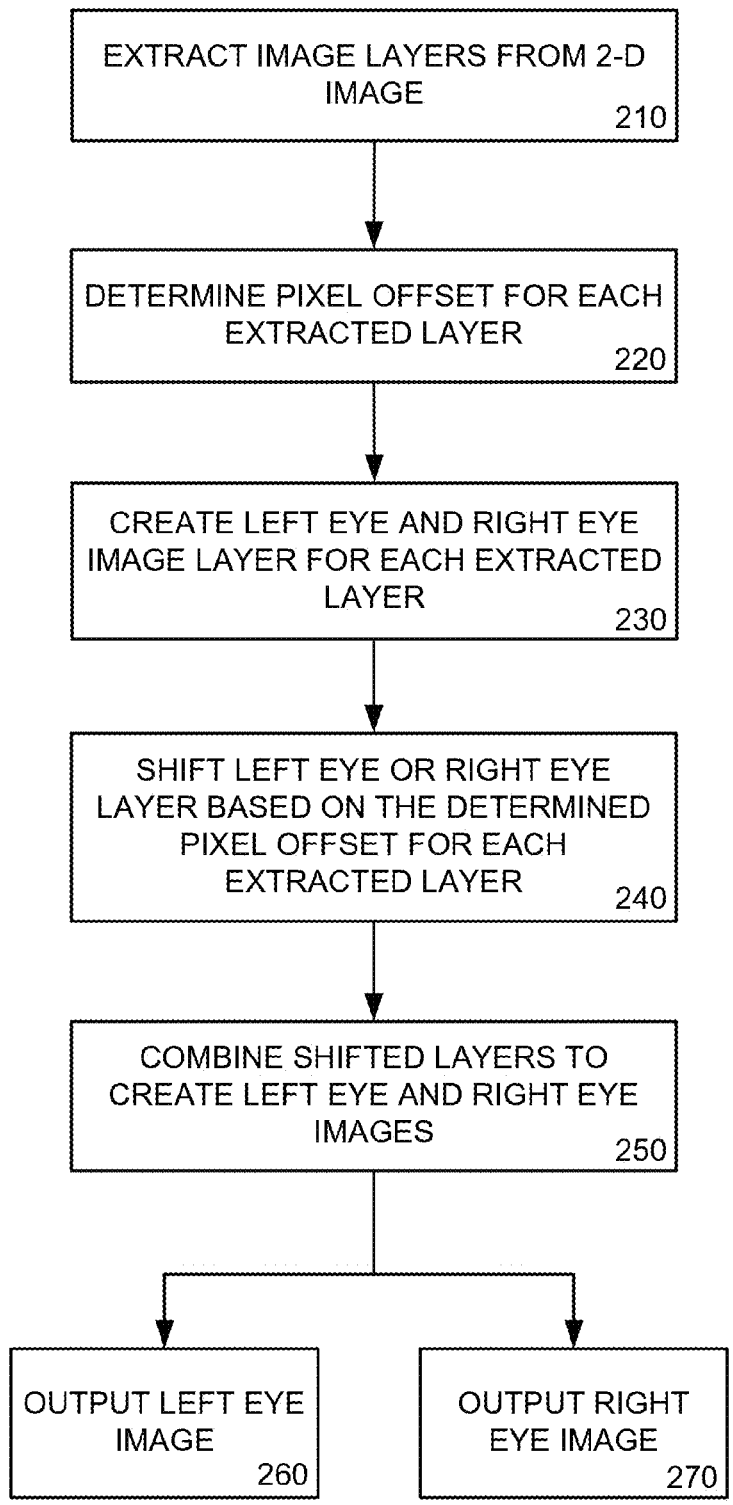
FIG. 2 is a flowchart of a method for converting a 2-D frame to a 3-D frame by utilizing the layers of the 2-D frame.

FIG. 2 is a flowchart of a method for converting a 2-D multimedia frame to a 3-D multimedia frame by utilizing pre-existing layers of the 2-D frame. In one embodiment, the method may utilize layers of frames of an animated film stored in a CAPS computer system database to convert the 2-D frames into 3-D frames. Thus, by performing the following operations for each frame of the animated film and combining the converted frames in sequence, the animated 2-D film may similarly be converted into a 3-D film. In one embodiment, the operations may be performed by one or more workstations or other computing systems to convert the 2-D frames into 3-D frames.

To begin converting a 2-D frame into a 3-D frame, a computing system may first extract the layers of the 2-D frame in operation 210. In one embodiment, the computing system may extract the layers from a database, such as a CAPS database, or from a computer-readable storage medium, such as external or removable storage, optical media, a workstation, or a combination thereof. In an alternate embodiment, each layer may be digitally extracted from the 2-D image. In this embodiment, a computing system may utilize a rotoscoping tool or other computer image processing tool to digitally remove one or more objects from the 2-D image to create a particular layer. Each stored layer may include a portion of a composite 2-D frame, as illustrated in FIG. 1. For example, one layer may include the background for the frame while a second layer may include one or more characters. Each frame may comprise any number of layers, with each layer stored on and accessible from the database or otherwise extracted. Further, each 2-D frame may form a frame of a 2-D animated film such that conversion of each 2-D frame into a 3-D frame may subsequently be used to produce a 3-D animated film.

Figure 3:
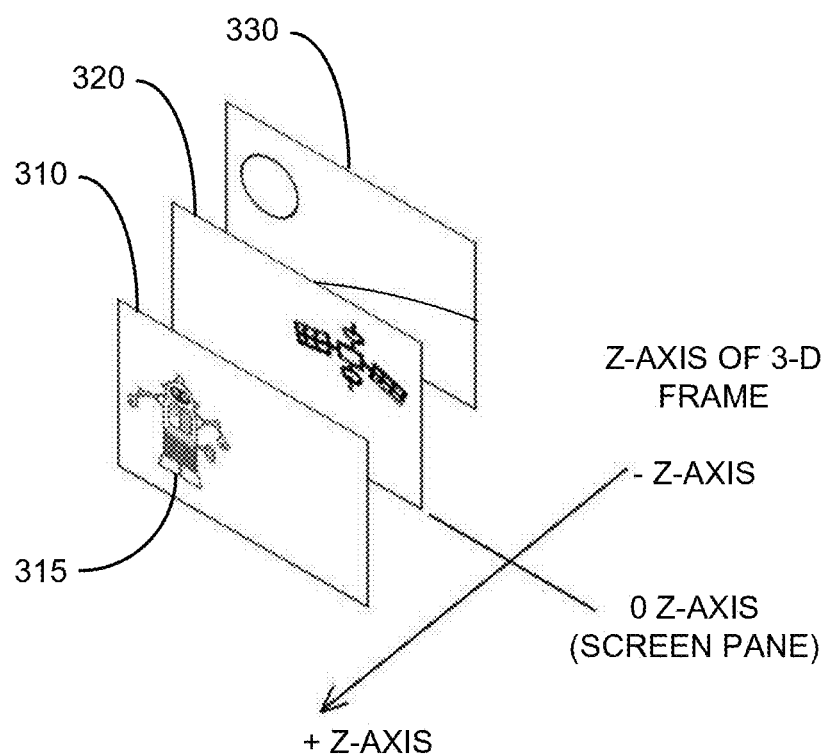
FIG. 3 is a diagram illustrating the position of several layers of a 3-D frame along a perceptual z-axis of the 3-D frame.

Upon retrieval of the layer, the computing system may determine a pixel offset or z-depth in operation 220 for the layer of the 2-D frame to provide the layer with a desired depth in the corresponding 3-D frame. For example, FIG. 3 is a diagram illustrating the position of several layers of a 3-D frame along a z-axis of the 3-D frame. As used herein, the z-axis of a 3-D frame or image represents the perceived position of a layer of the frame when viewed as a 3-D image. In one particular embodiment, any layer of the 3-D frame appearing in the foreground of the frame may have a corresponding positive z-axis position that indicates the position of the layer relative to the plane of the screen from which the 3-D frame is presented. Additionally, any layer appearing in the background of the 3-D frame may have a corresponding negative z-axis position while a layer appearing on the plane of the screen may have a zero z-axis position. However, it should be appreciated that the layers of the frame are not physically located at a z-axis positions described herein. Rather, because the stereoscopic 3-D frame appears to have depth when viewed in stereoscopic 3-D, the z-axis position merely illustrates the perceived position of a layer relative to the screen plane of the stereoscopic 3-D frame. This position, and hence the screen plane in this example, very often corresponds to what is known as the point of convergence in a stereoscopic system. Further, it is not necessary that a positive z-axis position correspond to the layer appearing in the foreground of the stereoscopic 3-D frame and a negative z-axis position correspond to the layer appearing in the background. Rather, any value may correspond to the perceived position of the layer of the stereoscopic 3-D frame as desired. For example, in some computer systems, layers that are perceived in the background of the stereoscopic 3-D frame may have a positive z-axis position while those layers in the foreground have a negative z-axis position. In still another example, the zero z-axis position corresponds with the furthest perceived point in the background of the stereoscopic 3-D frame. Thus, in this example, every layer of the stereoscopic 3-D frame has a positive z-axis position relative to the furthest perceived point in the background. As used herein, however, a z-axis position value corresponds to the example shown in FIG. 3.

Referring to FIG. 3, a first layer 310 including a robot character 315 similar to the first layer of FIG. 1 may be included in the 3-D frame. Further, the first layer 310 may be perceived to be located in the foreground of the 3-D frame. In other words, the position of the character 315 on the relative z-axis of the 3-D frame appears in the foreground of the 3-D frame. Similarly, the object 325 of the second layer 320 may appear as being located between the first layer 310 and the background 330 layer. In the example shown, the second layer 320 appears at the screen plane, or at a zero z-axis position. A third layer 330 may include the background and may be located in a negative z-axis position, or appear in the background of the 3-D frame. Thus, when viewed in 3-D, the one or more layers of the 3-D frame may appear to have depth relative to the z-axis position of the frame. The determination of where each layer is located in the z-axis of the 3-D frame may be made by an animator or by the computing system in response to cues in the original 2-D frame, such as colors, shades and other visual cues.

Returning to FIG. 2, to provide the perceived depth of the one or more layers of the 3-D frame, the computer system may determine a pixel offset corresponding to the relative position of the layer in the 3-D frame in operation 220. Generally, the value of the pixel offset directly correlates to the perceived depth of the layer in the 3-D image. Thus, the more positive or more negative the pixel offset value, the further from the screen plane the layer may appear, either in the foreground or the background, with no pixel offset placing the layer at the depth of the screen plane. To describe the pixel offset in relation to the z-axis of the 3-D frame, a positive pixel offset value of the left eye representation of the layer with respect to the right eye representation of the layer may provide the layer with the appearance of a positive z-axis position (i.e., in the foreground). Similarly, no pixel offset between the left eye and right eye representations of the layer may cause the layer to appear on the screen that the frame is being projected onto or from, while a negative pixel offset between the left eye representation of the layer with respect to the right eye representation of the layer may place the layer behind the viewing screen (i.e., in the background). Further, the higher the pixel offset value, the more extreme the z-position placement. Thus, a high positive pixel offset value may appear to locate a layer nearer the viewer of the 3-D frame than a smaller pixel offset value. It should be appreciated, however, that the pixel offset necessary to achieve the placement of the layer in the z-axis of the 3-D frame depends upon many factors, including the position of the viewer to the 3-D frame and the overall pixel size of the frame. Further, the pixel offset value may vary based on the computing system utilized to perform the offset. In one embodiment, a positive pixel offset value may place the layer in the foreground of the 3-D frame. In an alternate embodiment, a positive pixel offset value may be configured to place the layer in the background. As used herein, however, a positive pixel offset value corresponds to a positive z-axis position for the layer, or in the foreground of the 3-D frame.

Other techniques may also be employed to provide additional 3-D effects to a layer of the 2-D frame that effects the pixel offset determined in operation 220. For example, volume may be added to one or more objects of the frame to provide a more nuanced 3-D feel to the objects of the frame. To add the visual effect of volume to an object of the frame, a depth map may be created for one or more objects of the frame. In one embodiment, the depth map may take the form of a gray scale applied to the object, where the whiter portions of the gray scale having a more positive z-axis position than the darker portion of the gray scale. Several techniques have been developed to apply the gray scale depth representation to an object of a 2-D frame, including blurring and gradient modeling. Through these additional techniques, a unique pixel offset may be determined for each pixel of the 2-D frame. Such techniques are described in more detail in related U.S. patent application Ser. No. 12/571,406 titled "METHOD AND SYSTEM FOR CREATING DEPTH AND VOLUME IN A 2-D PLANAR IMAGE" by Tara Handy Turner et. Al., U.S. patent application Ser. No. 12/571,412 titled "GRADIENT MODELING TOOLKIT FOR SCULPTING STEREOSCOPIC DEPTH MODELS FOR CONVERTING 2-D IMAGES INTO STEREOSCOPIC 3-D IMAGES" by Tara Handy Turner et. al., and U.S. patent application Ser. No. 12/571,418 titled "APPARATUS AND METHOD FOR REMOVING INK LINES AND SEGMENTATION OF COLOR REGIONS OF A 2-D IMAGE FOR CONVERTING 2-D IMAGES INTO STEREOSCOPIC 3-D IMAGES" by Tara Handy Turner et. al., the contents of which are all incorporated in their entirety by reference herein.

Once the desired pixel offset is determined for each layer and pixel of the 2-D frame in operation 220, corresponding left eye and right eye frames may be created for each layer in operation 230 and shifted in response to the determined pixel offset in operation 240 to provide the different perspectives of the layer for the 3-D effect. For example, to create a left eye layer that corresponds to a layer of the 2-D frame, a digital copy of the 2-D layer may be created and shifted, either to the left or to the right in relation to the original layer, a particular number of pixels based on the determined pixel offset. Similarly, to create the corresponding right eye layer, a digital copy of the 2-D layer may be shifted a particular number of pixels, either to the left or to the right in relation to the 2-D layer. When the corresponding left eye and right eye frames are viewed simultaneously or nearly simultaneously, the object appearing in the corresponding frames appears to be in the foreground or background of the 3-D frame, based on the pixel offset. The direction that the left eye or right eye layers are shifted in operation 240 determines whether the object included in the layers is placed in the foreground or background of the 3-D frame.

In general, the shifting or offsetting of the left or right eye layer involves the horizontal displacement of one or more pixel values of the layer. For example, a particular pixel of the left or right eye layer may have a pixel color or pixel value that defines the pixel as red in color. To shift the left or right eye layer based on the determined pixel offset, a copy of the pixel value that defines the color red is horizontally offset by a certain number of pixels or other consistent dimensional measurement along the x-axis or otherwise horizontal, such that the new or separate pixel of the layer now has the shifted pixel value, resulting in the original pixel horizontally offset from the copy. For example, for a pixel offset of 20, a pixel of the left or right eye layer located 20 pixels either to the left or the right is given the pixel value defining the color red. Thus, there is a copy of the pixel horizontally offset (x-offset) from the original pixel, both with the same color red, 20 pixels apart. In this manner, one or more pixel values of the left or right eye layer are horizontally offset by a certain number of pixels to created the shifted layer. As used herein, discussion of "shifting" a pixel or a layer refers to the horizontal offsetting between the original pixel value and its copy.

Figure 4:
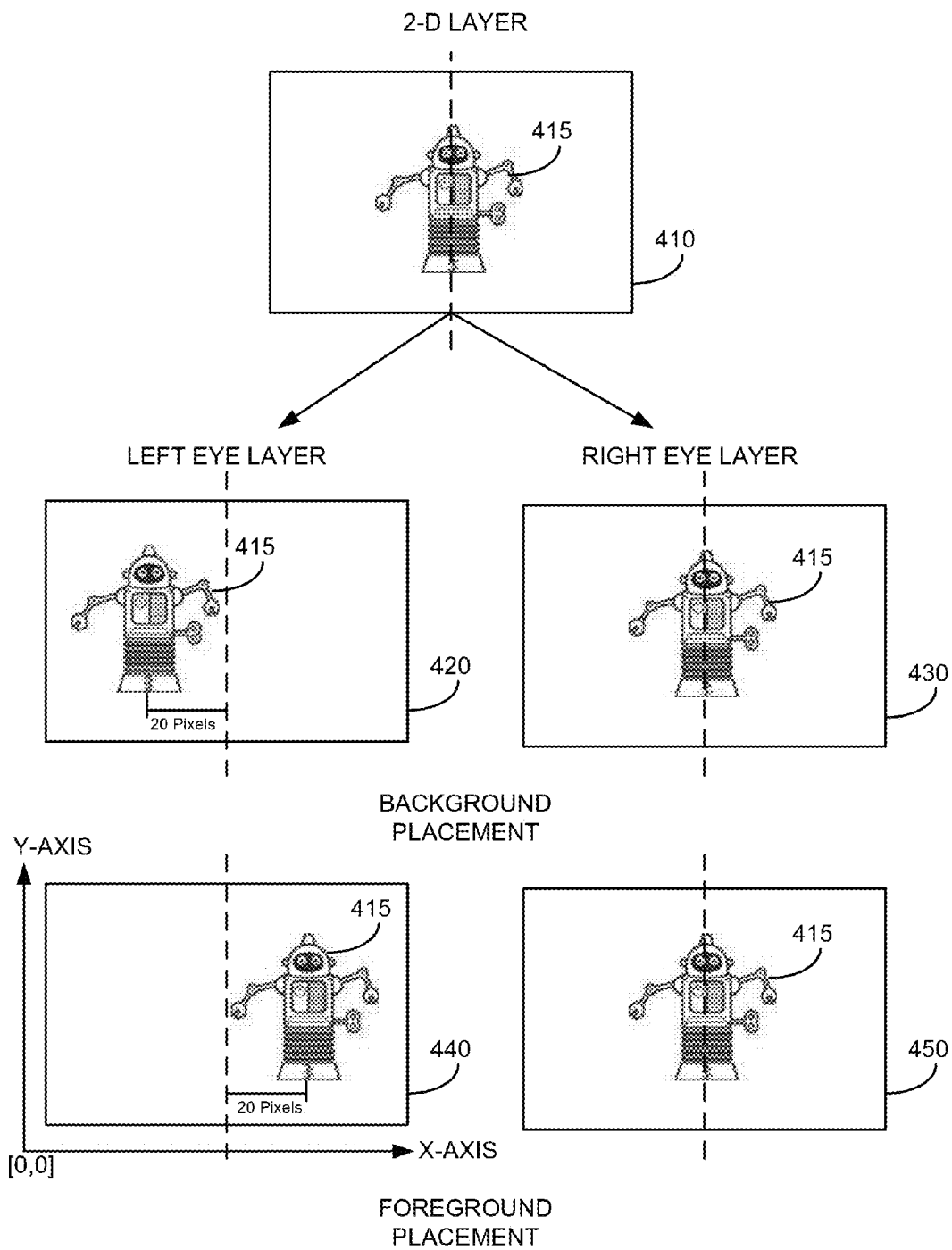
FIG. 4 is a diagram illustrating the creation of corresponding left eye and right eye layers from a 2-D layer, with the left eye layer shifted by a pixel offset to create a foregrounds and background 3-D effect.
Figure 5:
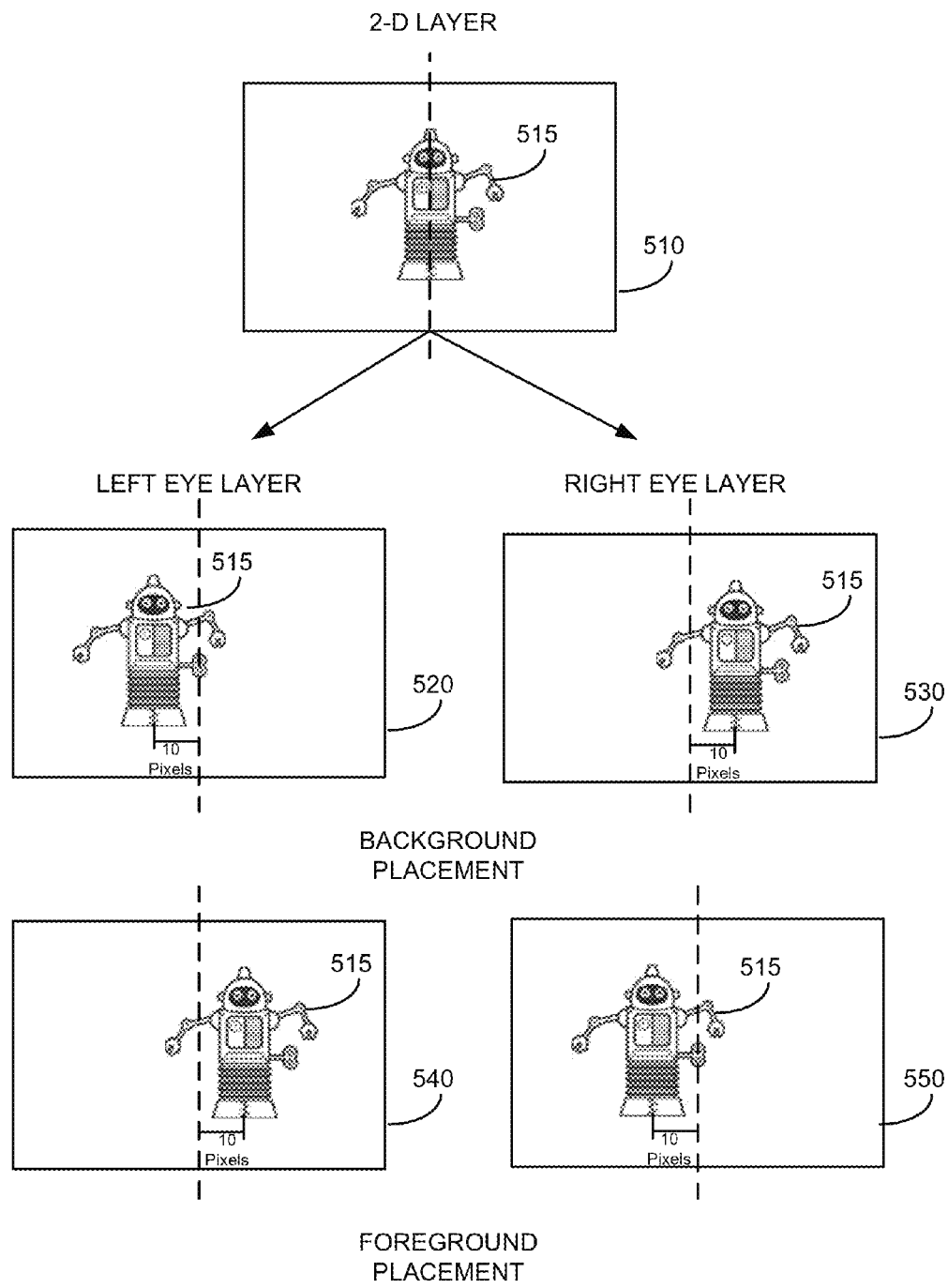
FIG. 5 is a diagram illustrating the creation of corresponding left eye and right eye layers from a 2-D layer, with both layers shifted such that the total pixel shift of the layers equals a determined pixel offset to create a foreground and background 3-D effect.

FIGS. 4 and 5 provide two examples of the creation of corresponding left eye and right eye layers of a 2-D frame that can be viewed simultaneously to create a 3-D effect to the objects of the frames. More particularly, FIG. 4 is a diagram illustrating the creation of corresponding left eye and right eye layers from a 2-D layer, with the left eye layer shifted by a pixel offset relative to the right eye layer. FIG. 5 is a diagram illustrating the creation of corresponding left eye and right eye layers from a 2-D layer, with both left eye and right eye layers shifted such that the total pixel shift of the layers equals the determined pixel offset.

As shown in FIG. 4, a left eye layer 420 and a right eye layer 430 corresponding to a layer 410 of the 2-D frame may be created such that the combination of the left eye layer and the right eye layer provides a 3-D effect to the robot character 415 of the layer when viewed simultaneously. In this embodiment, the content of the left eye layer 420 and the right eye layer 430 is identical to the content of the 2-D layer 410, as each layer contains the robot character 415. The only difference is that the robot character 415 is shifted in the left eye layer 420 by a determined number of pixels along the x-axis such that when the right eye layer 430 and the left eye layer 420 are combined or viewed together, the character appears in a position along the z-axis of the 3-D frame. Generally, the shifting of the left eye and/or right eye layers occur in the x-axis only.

The direction that either the left eye layer or the right eye layer is shifted determines whether the objects depicted in those layers appears in the foreground of the 3-D frame or the background of the 3-D frame. For example, as shown in FIG. 4, to place a layer in the background of the 3-D frame, the corresponding left eye layer 420 may be shifted to the left by the determined pixel offset value while the right eye layer 430 may not be shifted at all. Thus, the right eye layer 430 is identical to the 2-D layer 410 from which the right eye layer is derived from, while the left eye layer 420 is shifted along the x-axis to the left. When the right eye layer 430 and the shifted left eye layer 420 are viewed together, the robot character 415 appears in the background, or behind the screen plane. A similar effect may be achieved by shifting the right eye layer 430 to the right by the pixel offset value while not shifting the left eye layer 420 at all.

Alternatively, to place a layer in the foreground of the 3-D frame, the corresponding left eye layer 440 may be shifted to the right by a pixel offset value while the right eye layer 450 may not be shifted at all. Thus, in this embodiment, the right eye layer 450 is identical to the 2-D layer 410 from which the right eye layer is derived from, while the left eye layer 440 is shifted along the x-axis to the right. When the right eye layer 450 and the shifted left eye layer 440 are viewed together, the robot character 415 appears in the foreground of the frame, or in front of the screen plane. A similar effect may be achieved by shifting the right eye layer 450 to the left by the pixel offset value while not shifting the left eye layer 440 at all.

In a second embodiment depicted in FIG. 5, both of the corresponding left eye layer 520 and right eye layer may be shifted to provide the different perspectives of the layer that form the 3-D effect for the layer. Similar to the embodiment shown in FIG. 4, a left eye layer 520 and a right eye layer 530 is created from the 2-D layer 510 such that the combination of the left eye layer and the right eye layer provides a 3-D effect to the contents of the layer. However, in this example, the left eye layer 520 may be shifted to the left while the right eye layer 530 may be shifted to the right along the x-axis in response to a pixel offset. When the shifted right eye layer 530 and the shifted left eye layer 520 are viewed together, the robot character 515 appears in the background, or behind the screen plane. To place a layer in the foreground of the 3-D frame, the corresponding left eye layer 540 may be shifted to the right while the right eye layer 550 may be shifted to the left along the x-axis. Thus, when the shifted right eye layer 550 and the shifted left eye layer 540 are viewed together, the robot character 515 appears in the foreground of the frame, or in front of the screen plane.

The number of pixels that one or both of the left eye and right eye layers are shifted in operation 240 of FIG. 2 may be based on the pixel offset value determined in operation 220. As stated, the value of the pixel offset directly correlates to the perceived depth of the layer of the 3-D image. Thus, the higher the pixel offset value, the further from the screen plane the layer may appear, either in the foreground or the background, while no pixel offset may place the layer at the screen plane. In one example, the pixel offset may be determined to be a positive 20 total pixels, such that the layer may appear at a positive z-axis position in the corresponding 3-D frame, or in the foreground of the 3-D frame. Such a pixel offset is depicted in FIG. 4. In this embodiment, the left eye layer 440 is shifted 20 pixels to the right from the original placement of the 2-D layer 410, while the right eye layer 450 may not be shifted at all. As can be seen, the robot character 415 of the left eye layer 440 has been displaced 20 pixels to the right of the center depicted by the vertical dashed line while the robot character 415 of the right eye layer 450 remains as in the 2-D layer 410. The total displacement of the layers between the left eye layer 440 and the right eye layer 440 is 20 pixels, based on the determined pixel offset. Therefore, when the left eye 440 and the right eye 450 are viewed simultaneously or nearly simultaneously, a slightly different perspective of the robot character 415 is provided to the viewer, resulting in a perceived depth of the character in the foreground of the 3-D frame.

The shifting of the pixels of the left eye layer 440 may be described further with reference to the layer as a type of graph containing all of the pixels of the layer, with the bottom left corner of the layer at [x,y] position [0,0]. Thus, one particular pixel of the robot character 445 of the left eye layer 440 may be located at an [x,y] position of [100,200] of the left eye layer. Thus, after the 20 pixel shift is applied to the layer, the same pixel may be located at an [x,y] position of [120,200], or shifted 20 pixels to the right.

In this embodiment, each pixel of the layer is shifted in accordance with the determined pixel offset. Thus, some pixels at the edges of the layers may be lost as the layer is shifted along the x-axis. Further, some pixels may be filled in at the opposite edge of the layer to account for the shifting of the pixels of the layer. Several methods may be used to fill in the missing pixels after the shift. In one embodiment, the layer may be re-cropped around the missing pixels. In another embodiment, the computing system may perform one or more algorithms to estimate the color of the missing pixels and fill in those pixels based on the algorithms. In yet another embodiment, the original 2-D layer may be larger than the final output image (oversize) or may be scaled up to a size larger than the final output frame in order to provide pixel information outside the edges that, when shifted, fill the edge areas. Further, it is not required at each pixel of the layer be shifted according to the determined pixel offset. Rather, each individual pixel of the layer may have a corresponding pixel offset, as explained in more detail in the related patent applications. In the embodiments where each pixel has a corresponding pixel offset, the above techniques to fill in the missing pixels may also be applied.

The same pixel offset may also be achieved through the embodiment depicted in FIG. 5. In this embodiment, to place the layer in the foreground, the left eye layer 540 may be shifted ten pixels to the right from the original placement of the 2-D layer 510, while the right eye layer 550 may be shifted ten pixels to the left. As can be seen, the robot character 515 of the left eye layer 540 has been displaced ten pixels to the right of the center depicted by the vertical dashed line while right eye layer 550 has been displaced to the left of center by ten pixels. Thus, the total displacement of the layers between the left eye layer 450 and the right eye layer 540 is 20 pixels, based on the determined pixel offset.

In general, the determined pixel offset may be achieved through the shifting of one of the left eye or right eye layer or the combined shifting of the left eye and the right eye layers in either direction. Further, the particular number of pixels that each layer is shifted may vary, as long as the number of pixels shifted for both layers equals the overall pixel offset. For example, for a 20 pixel offset, the left layer may be shifted five pixels while the right layer may be shifted 15 pixels. Generally, the layers may be shifted any number of pixels desired such that the total pixel shift equals the overall determined pixel offset. However, shifting the left and right layers in this manner will often result in a slightly different perspective of the layer than shifting in equal amounts, but this result may generate a desired creative effect or may be negligible to the viewer while being advantageous for the purposes of simplifying an image processing step such as the extraction of the layer.

Figure 6:
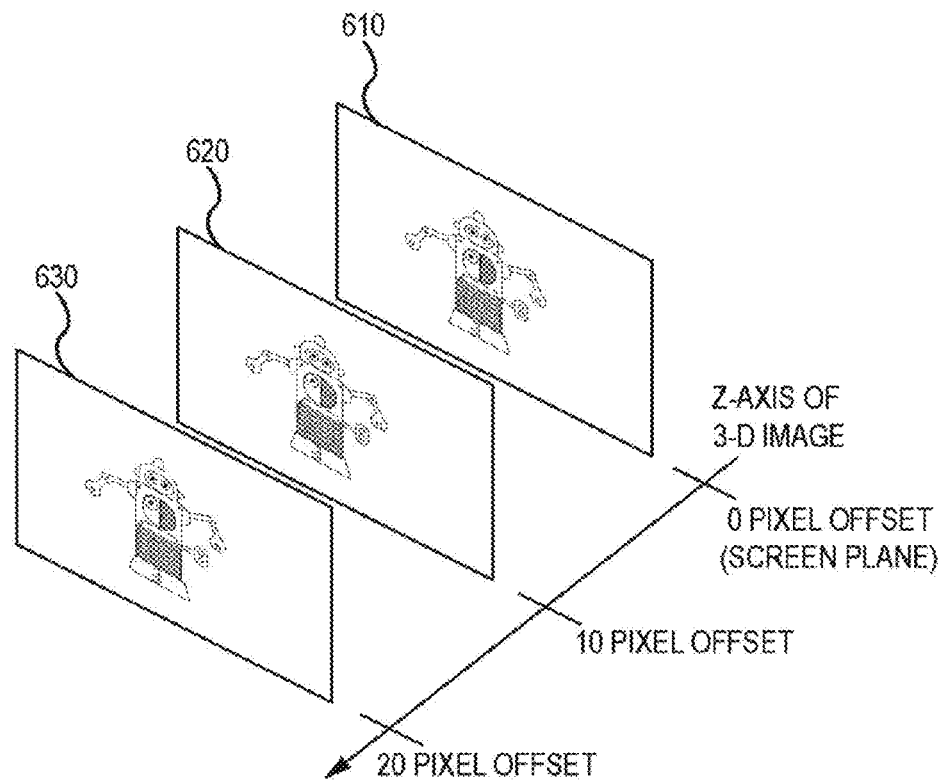
FIG. 6 is a diagram illustrating several locations of a layer of the 3-D frame corresponding to several pixel offsets applied to the corresponding left eye and/or right eye layers.

In addition, the value of pixel offset applied to shifting the left eye and right eye layers determines the relative position of that layer along the z-axis of the 3-D frame. FIG. 6 is a diagram illustrating several locations of a layer along a z-axis of the 3-D frame corresponding to several pixel offsets applied to the corresponding left eye and/or right eye layers. As shown, a first layer 610 with zero pixel offset appears to be located at the screen plane from which the 3-D frame is presented. A second layer 620 with a positive pixel offset of ten would be located along the positive z-axis of the 3-D frame, or in the foreground of the 3-D frame. A third layer 630 with a 20 pixel offset may be located even further from the screen plane in the foreground relative to the second layer 620 with the ten pixel offset. Generally, the higher the value of the pixel offset, the further from the screen plane the layer may appear. Further, while the examples shown in FIG. 6 are located along the positive z-axis, the layers may also appear along the negative z-axis, or behind the screen plane. Similar to the above example, the larger the negative pixel offset, the further away from the screen plane into the background the layer may appear. Thus, in this embodiment, a negative 20 pixel offset layer would appear behind a negative ten pixel offset layer.

Returning to FIG. 2, operations 210 through 240 may repeated for each layer of the 2-D frame such that corresponding left eye layers and right eye layers are created for each layer of the frame. Thus, upon the creation of the left eye and right eye layers, each layer of the frame has two corresponding layers (a left eye layer and a right eye layer) that has been shifted in response to the determined pixel offset for that layer. Further, the embodiments employed to shift the different layers of a frame may vary between the layers. For example, a first layer may be pixel offset by only shifting the left eye layer that corresponds to that particular layer. Alternatively, a second layer of the same frame may be pixel offset by shifting both the corresponding left eye layer and the right eye layer. The manner by which each layer is pixel offset is independent of the shifting of the other layers within the same frame.

In operation 250, the computer system may combine each created left eye layer corresponding to a layer of the 2-D frame with other left eye layers corresponding to the other layers of the 2-D frame to construct the complete left eye frame to be presented to the viewer. In one embodiment, the computer system may combine the layers by digitally superimposing the layers, similar to combining several cells of a cell animation. In the embodiment where the layers are extracted from the 2-D frame, the layers may be combined by re-inserting the layers back into the frame. This embodiment may or may not require pixels to be generated or manipulated on the original 2-D frame to replace the edges or holes caused by the extraction of the new layer from the 2-D frame. In addition to the left eye layers being combined, each right eye layer corresponding to a layer of the 2-D frame may also be combined with other right eye layers to construct the complete right eye frame to be presented to the viewer. Further, one or more of the left eye layers and one or more of the right eye layers may be pixel shifted in response to a pixel offset value. Thus, the combined left eye frame and combined right eye frame may be presented to a viewer to create a 3-D frame that corresponds to the 2-D frame.

Figure 7:
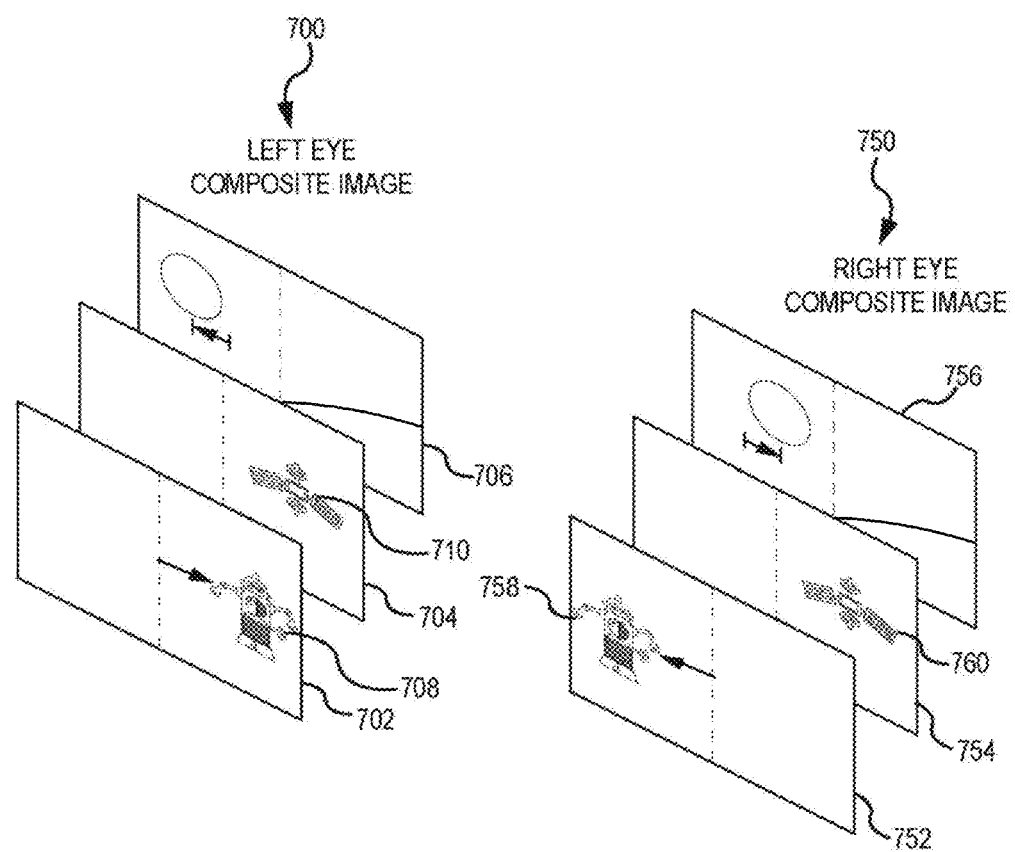
FIG. 7 is a diagram illustrating a combination of several left eye layers and right eye layers created from a plurality of digitized layers of a 2-D frame.

The combining of left eye layers and right eye layers with a pixel offset may best be seen in FIG. 7. The left eye frame and right eye frame shown in FIG. 7 are both comprised of three layers. The left eye frame 700 includes a first layer 702 containing a character 708, a second layer 704 containing an object 710 and a third layer 706 as a background. The right eye frame 750 also includes a first layer 752 containing a character 758, a second layer 754 containing an object 760 and a third layer 756 as a background. Further, each of the layers depicted may be shifted in response to a determined pixel offset prior to combining the layers. For example, the first left eye layer 702 may be shifted a certain number of pixels to the right from the center position. Similarly, the first right eye layer 752 may be shifted a certain number of pixels to the left. In all, the combined number of pixels that the first left eye layer 702 and the first right eye layer 752 is shifted equals the determined pixel offset. Thus, when the first left eye layer 702 and the first right eye frame layer 752 are viewed together, the character 708 of the layers appears to be in front of the viewing screen corresponding to the pixel offset of that particular layer. In this example, the pixel offset of the first layers 702,752 equals 20 pixels, placing the layer in the positive z-axis of the corresponding 3-D frame.

Similarly, the third layers 706, 756 may also be shifted to locate the background of the third layer along the z-axis of the 3-D frame. In this example, the total pixel offset for the third layers 706, 756 is such that the background layer appears behind the screen plane of the 3-D frame. In the example shown, the third layers 706,756 has a total pixel offset of negative ten pixels. To provide the 3-D effect of the background layers behind the screen plane, the third left eye layer 706 may be shifted to the left by five pixels and the third right eye layer 756 may be shifted to the right by five pixels. Thus, the total pixel shift of the third left eye layer 706 and the third right eye layer 756 is ten pixels, with the placement of the layer in the background of the 3-D frame.

Additionally, the second left eye layer 704 and the second right eye layer 754 may not be shifted at all prior to the combination of the layers. Thus, when the second left eye layer 704 and the second right eye layer 754 are viewed simultaneously, the objects contained within those layers will appear to be located at the screen plane. Thus, upon completion of operation 250, the combined left eye frame and the combine right eye frame may be presented simultaneously or nearly simultaneously to provide a 3-D effect to the frame. In the example shown, the first layers 702, 752 appear shifted along the positive z-axis of the 3-D frame, or in the foreground of the image, the third layers 706,756 appear shifted along the negative z-axis or behind the screen plane and the second layers 704, 754 appear not shifted in the z-axis at all. Thus, when the composite frame is viewed in 3-D, the second layers 704, 754 will appear to be at the level of the display screen while the first layers 702, 752 will appear in the foreground and the third layers 706, 756 will appear in the background.

Returning to FIG. 2, in operation 260, the combined left eye layers are output as the left eye frame for the converted 3-D frame. Similarly, the combined right eye layers are output as the right eye frame for the converted 3-D frame in operation 270. When viewed simultaneously or nearly simultaneously, the two frames provide a depth effect to the frame, converting the original 2-D frame to a corresponding 3-D frame. For example, some stereoscopic systems provide the two frames to the viewer at the same time but only allows the right eye to view the right eye frame and the left eye to view the left eye frame. One example of this type of stereoscopic systems is a red/cyan stereoscopic viewing system. In other systems, the frames are provided one after another while the system limits the frames to the proper eye. Further, to convert a 2-D film to a stereoscopic 3-D film, the above operations may be repeated for each frame of the film such that each left eye and right eye frame may be projected together and in sequence to provide a stereoscopic 3-D effect to the film.

Several methods exist to display the left eye and right eye frames of a 3-D frame. For example, an anaglyph image may present the two frames for each of the viewer's eyes in different colors, such as red and blue-green. To achieve the 3-D effect, the viewer wears glasses with color filter lenses that filter the color(s) so as to present only one of the images for each eye. Thus, the viewer's right eye receives the red frame while the viewer's left eye receives the blue-green frame. When the left-eye frame and the right-eye frame are viewed at the same time, the viewer perceives a 3-D effect. In another example, left-eye and right-eye frames are superimposed through polarizing filters such that one image is clockwise polarized and the other image is counter-clockwise polarized. The viewer wears glasses with polarized lenses such that each eye receives only one of the frames. In a third example, the 3-D frames are presented in a time-multiplexed fashion, such as alternating between frames meant for the viewer's right eye and the viewer's left eye. The viewer wears glasses that shutter between the viewer's eyes, allowing the right eye to receive the right eye frame and the left eye to receive the left eye frame.

One advantage realized by the present disclosure is the ability to utilize oversized background frames when converting the 2-D multimedia presentation into 3-D. In many cell-animated feature films, large background cells were constructed that could be used for multiple frames of the film. The large background cells also allowed the camera to pan across the background such that a single background could be constructed for an entire scene, spanning several frames. By constructing a single large background cell that is applied to several frames of a scene, the necessity of having to construct a background for each frame of a scene is removed.

Traditionally, to convert a 2-D film into a 3-D film, each frame of the 2-D film would have to be converted individually. For example, in converting a live action film from 2-D into 3-D, each frame of the 2-D live action film is rendered in 3-D. Thus, the background of the frame would have to be rendered in 3-D for each frame of a scene, resulting in redundant 3-D rendering of the background. Such a technique is time consuming and computationally intensive. However, by utilizing the information stored in the CAPS system, such a technique may be streamlined and improved. As mentioned, the CAPS system may store oversized backgrounds used for multiple frames of a film as a single layer in the system. Thus, the 3-D rendering techniques described above may be applied to the entire background in a single set of operations, rather than requiring the 3-D rendering to be performed for each frame. Once rendered as a 3-D layer, the layer may be applied to any frame as necessary. Thus, the 3-D rendering of the background may be performed once for the entire scene utilizing the single background frame and the stored camera information in the system. Thus, the time required to render the background as well as the computational power used may be reduced.

Further, in some scenes of a film, the camera may rotate along a particular background. To account for the different perspectives that would be shown during such a camera movement, some stored background layers may be distorted to address the different perspectives of the background as the camera rotates around the scene. Such distortion may be further utilized by the above techniques as an additional indication of the proper pixel offset to apply to each portion of the background layer. In other words, the distortion may provide further cues as to the proper z-axis position of each layer during the 3-D rendering of a scene. Thus, by utilizing the over-sized background layers stored in a CAPS-type system, the 3-D rendering of a multimedia presentation may further be improved.

Figure 8:
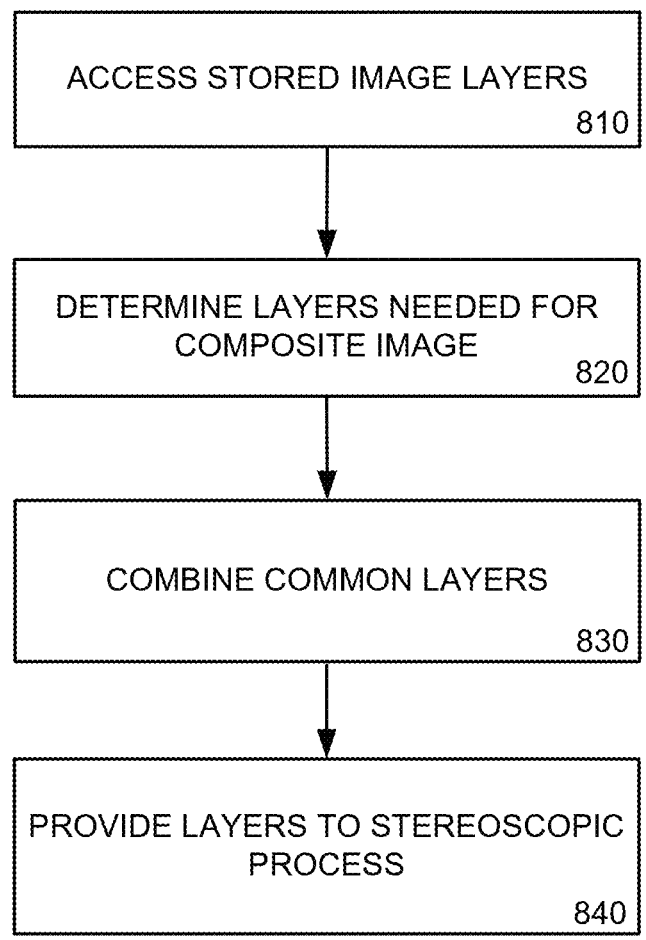
FIG. 8 is a flowchart of a method for accessing a database maintaining a plurality of layers of a frame of an animated multimedia presentation.

As mentioned, each layer of a particular frame of a multimedia presentation may be stored in a computer-readable database, such as CAPS. FIG. 8 is a flowchart of one method for accessing a database maintaining a plurality of layers of an frame of an animated multimedia presentation for purposes of converting the frames into 3-D frames. The operations of the method of FIG. 8 may correspond to operation 210 of FIG. 2. Thus, in one embodiment, the operations may be performed by one or more workstations or other computing system.

Beginning in operation 810, a computing system may access a database or other computer-readable storage medium to retrieve one or more layers of a 2-D multimedia frame. In one example, the layers may be stored in a CAPS database. Each stored layer may comprise a portion of the overall 2-D frame of the multimedia presentation. Further, the one or more layers for each frame may be combined to form a frame of the multimedia presentation.

In operation 820, the computing system may determine which layers are needed to form the composite 2-D frame. As mentioned, several of the stored layers associated with a frame may not be included in the final 2-D frame, such as layers containing instructions or other undesired content. These layers may be utilized while the frame is being constructed, but may be left out of the final composite 2-D frame. Thus, the layers that contain portions of the constructed 2-D frame may be determined in operation 620 while those layers not included may be discarded.

Once the proper layers are determined, layers containing similar content may be combined in operation 630 to reduce the overall number of layers that are rendered in 3-D. For example, one layer of the frame may include ink lines of a character's arm, while another layer may include color and shading of the same arm. However, when the entire frame is constructed and viewed, the ink line layer and the color layer appear to be continuous to the rest of the character of the frame. Further, because it is likely that the character and the character's arm are to appear at the same position in the z-axis in the 3-D frame, the ink line layer and the color layer for the character's arm may be combined with a layer including the rest of the character before 3-D rendering. Combining the three layers may reduce the total number of layers that are rendered in 3-D.

In some frames, it may be desired to place the character's arm in a different z-axis position than the rest of the character. In this situation, the ink line layer and the color layer may be combined and rendered separately from the other layers containing the rest of the drawn character such that the arm layer lies in a different z-axis position within the 3-D frame. In this manner, any of the accessed layers of the 2-D frame may be combined to reduce the total number of layers that are included in the 3-D frame. The layers may be digitally combined by the computing system and stored as a separate file within the database or an alternate database.

In operation 840, the layers may be provided to a stereoscopic rendering computing system to convert the layers into 3-D. Thus, each layer determined to be needed in operation 820, as well as the combined layers from operation 830 may be provided to the computing system. It should be appreciated that any number of the stored layers may be included in the 3-D frame. For example, some frames of the multimedia film may be contained in a single layer, while other frames may be comprised of several layers.

Figure 9:
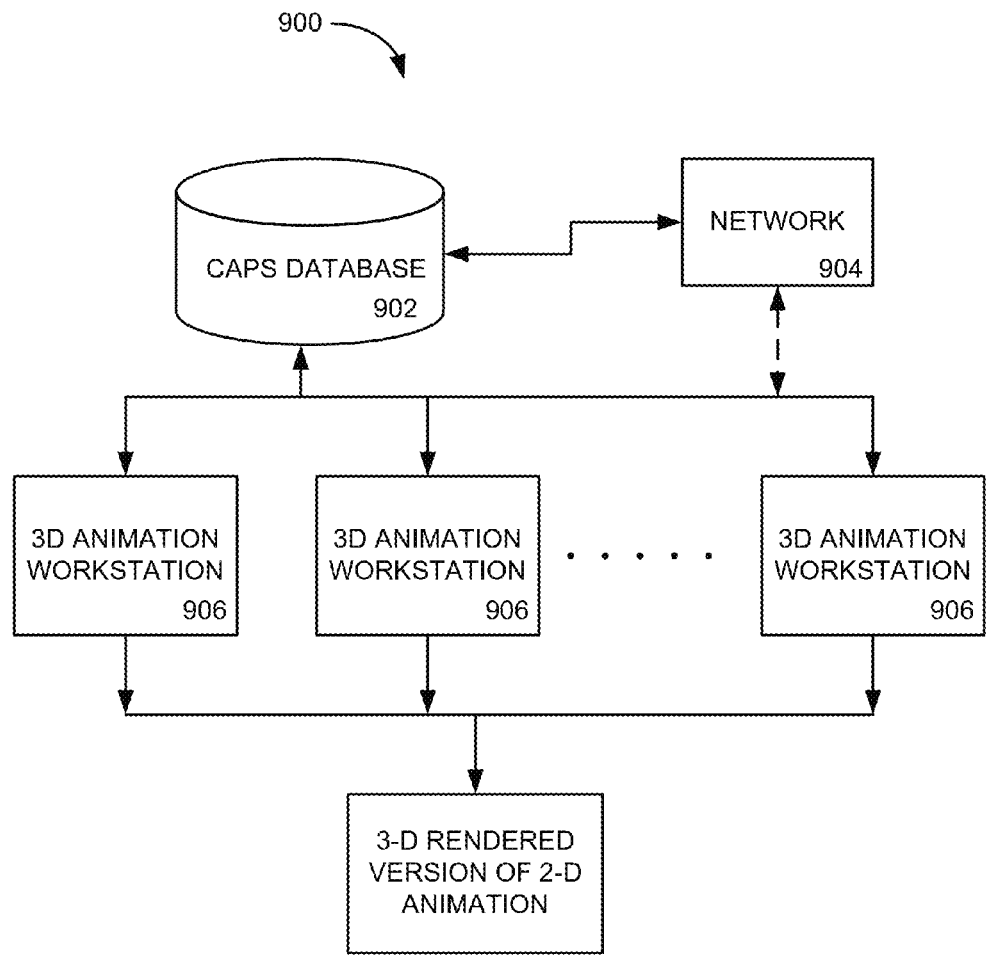
FIG. 9 is a high-level block diagram illustrating a particular system for converting a 2-D frame of a multimedia presentation to a 3-D frame.

FIG. 9 is a high-level block diagram illustrating a particular system 900 for converting a 2-D frame of a multimedia presentation to a 3-D frame. The system described below may perform one or more of the operations herein.

The system 900 may include a CAPS database 902 to store one or more scanned or digitally created layers for each frame of the multimedia presentation. In one embodiment, the database 902 may be sufficiently large to store the many layers of an animated feature film. Generally, however, the database 902 may be any machine readable medium. A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory. Common forms of machine-readable medium may include, but are not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. Alternatively, the layers of the 2-D frames may be stored on a network 904 that is accessible by the database 902 through a network connection. The network 904 may comprise one or more servers, routers and databases, among other components to store the frame layers and provide access to such layers.

The system 900 may also include one or more computing systems 906 to perform the various operations to convert the 2-D frames of the multimedia presentation to 3-D frames. Such computing systems 906 may include workstations, personal computers, or any type of computing device, including a combination therein. Such computer systems 906 may include several computing components, including but not limited to, one or more processors, memory components, I/O interfaces, network connections and display devices. Memory of the computing systems 906 may be used for storing information and instructions to be executed by the processors. Memory also may be used for storing temporary variables or other intermediate information during execution of instructions by the processors of the computing systems 906. In addition, the computing systems 906 may be associated with the database 902 to access the stored frame layers. In an alternate embodiment, the computing systems 906 may also be connected to the network 904 through a network connection to access the stored layers. The system set forth in FIG. 9 is but one possible example of a computer system that may employ or be configured in accordance with aspects of the present disclosure.

It should be noted that the flowcharts of FIGS. 2 and 8 are illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for utilizing stored two dimensional frames to generate a plurality of stereoscopic frames comprising:
   receiving a first two dimensional frame, having a first dimension and second dimension, comprising a first layer and second layer, each layer comprising at least one object, wherein at least one dimension of the first layer is greater than the first dimension or the second dimension of the first two dimensional frame and at least a portion of the first layer appears in at least two stereoscopic frames;
   determining a pixel offset for the at least one object of the first and second layers, the pixel offset corresponding to a perceived depth for the layer including the object and a perceived volume of the object in a first stereoscopic frame;
   generating a left eye layer and a right eye layer for the first and second layers; and
   positioning the left eye layer relative to the right eye layer for the first and second layers based on the determined pixel offset to perceptually position the left eye layer and the right eye layer in the first stereoscopic frame.

2. The method of claim 1 further comprising:
   combining the generated left eye layers into a composite left eye frame; and
   combining the generated right eye layers into a composite right eye frame, wherein the composite left eye frame and the composite right eye frame comprise the stereoscopic frame.

3. The method of claim 1 wherein the positioning operation comprises:
   shifting one or more pixels of the left eye layer by the determined pixel offset.

4. The method of claim 1 wherein the positioning operation comprises:
   shifting one or more pixels of the right eye layer by the determined pixel offset.

5. The method of claim 1 wherein the positioning operation comprises:
   shifting one or more pixels of the left eye layer by a first percentage of the determined pixel offset in a first direction; and
   shifting one or more pixels of the right eye layer by a second percentage of the determined pixel offset in a second direction opposite the first direction.

6. The method of claim 5 further comprising filling in at least one pixel of at least one of the left eye layer or the right eye layer to account for the shifting.

7. The method of claim 1 wherein the first two dimensional frame is received from a database configured to store one or more two dimensional frames.

8. The method of claim 1 further comprising:
   digitizing one or more hand drawn images from an animated film; and
   storing the digitized images in a database, the digitized images comprising the first and second layers of the first two dimensional frame.

9. The method of claim 8 wherein one or more two dimensional frames are received from the database.

10. The method of claim 8 wherein said digitizing one or more hand drawn images from an animated film further comprises removing at least one object from the one or more hand drawn images.

11. A system for utilizing stored two dimensional frames to generate a plurality of stereoscopic frames comprising:
- at least one non-transitory machine readable medium; and
- at least one processing unit that executes instructions stored in the at least one non-transitory machine readable medium to:
  - receive a first two dimensional frame, having a first dimension and second dimension, comprising a first layer and second layer, each layer including at least one element, wherein at least one dimension of the first layer is greater than the first dimension or the second dimension and at least a portion of the first layer appears in at least two of the stereoscopic frames;
  - determine a pixel offset for the at least one element of the first and second layers, the pixel offset corresponding to a perceived depth for the layer including the object and a perceived volume of the object in a first stereoscopic frame;
  - generate a left eye layer and a right eye layer for the first and second layers; and
  - position the left eye layer relative to the right eye layer for the one or more layers based on the determined pixel offset to perceptually position the left eye layer and the right eye layer in the first stereoscopic frame.

12. The system of claim 11 wherein the at least one processing unit further executes instructions stored in the at least one non-transitory machine readable medium to:
- combine the generated left eye layers into a composite left eye frame; and
- combine the generated right eye layers into a composite right eye frame, wherein the composite left eye frame and the composite right eye frame comprise the stereoscopic frame.

13. The system of claim 11 wherein the at least one processing unit positions the left eye layer relative to the right eye layer by shifting one or more pixels of the left eye layer by the determined pixel offset.

14. The system of claim 11 wherein the at least one processing unit positions the left eye layer relative to the right eye layer by shifting one or more pixels of the right eye layer by the determined pixel offset.

15. The system of claim 11 wherein the at least one processing unit positions the left eye layer relative to the right eye layer by:
- shifting one or more pixels of the left eye layer by a first percentage of the determined pixel offset in a first direction; and
- shifting one or more pixels of the right eye layer by a second percentage of the determined pixel offset in a second direction opposite the first direction.

16. The system of claim 15 wherein the at least one processing unit further executes instructions stored in the at least one non-transitory machine readable medium to fill in at least one pixel of at least one of the left eye layer or the right eye layer to account for the shifting.

17. The system of claim 11 wherein the first two dimensional frame is received from a database configured to store one or more two dimensional frames.

18. The system of claim 11 wherein the at least one processing unit further executes instructions stored in the at least one non-transitory machine readable medium to:
- digitize one or more hand drawn images from an animated film; and
- store the digitized images in a database, the digitized images comprising the first and second layers of the first two dimensional frame.

19. The system of claim 18 wherein one or more two dimensional frames are received from the database.

20. The system of claim 18 wherein the at least one processing unit digitizes the one or more hand drawn images from the animated film by removing at least one object from the one or more hand drawn images.

21. The method of claim 1, further comprising:
- receiving a second two dimensional frame comprising the first layer and a third layer, the third layer comprising at least one object;
- determining a pixel offset for the least one object of the third layer;
- accessing from a memory component the determined pixel offset for the least one object of the first layer; and
- generating a second stereoscopic frame using the pixel offset for the at least one object of the third layer and the previously determined pixel offset for the at least one object of the first layer.

22. The method of claim 1, wherein at least one dimension of the first layer is greater than at least one dimension of the second layer.

23. The method of claim 1 further comprising storing in a memory component the pixel offset corresponding to the at least one object in the first layer for use in generating a second stereoscopic frame.

24. The method of claim 1, wherein the first layer is a background layer corresponding to the first two dimensional frame and at least a second two dimensional frame.

25. The method of claim 1, wherein
- the first two dimensional frame further comprises a third layer comprising a third object; and
- a number of layers of the first stereoscopic frame is less than a number of layers of the first two dimensional frame.

26. The method of claim 25, further comprising:
- analyzing by a processor content in both the second layer and the third layer; and
- combining the second layer with the third layer to create a combined layer if the second layer and the third layer have similar content.

27. A method for converting two dimensional content into three dimensional content, comprising:
- receiving from a memory device a first two dimensional frame having a first dimension and a second dimension comprising
  - a first layer including at least a first object; and
  - a second layer including at least a second object; wherein
  - the first layer has a dimension greater than at least one of the first and second dimensions
- duplicating the first layer to create a first left eye layer and a first right eye layer;
- duplicating the second layer to create a second left eye layer and a second right eye layer;
- determining by a processor a first pixel offset for the first object and a second pixel offset for the second object;
- creating a first stereoscopic frame by positioning the first left eye layer relative to the first right eye layer based on the first pixel offset and the second left eye layer relative to the second right eye layer based on the second pixel offset;
- receiving from the memory device a second two dimensional frame comprising
  - the first layer including the first object; and
  - a third layer including at least a third object;
- duplicating the third layer to create a third left eye layer and a third right eye layer;

determining by the processor a third pixel offset for the third object;

retrieving by the processor the first pixel offset for the first object; and creating a second stereoscopic frame by positioning the first left eye layer relative to the first right eye layer based on the first pixel offset and the third left eye layer relative to the second right eye layer based on the third pixel offset.

* * * * *